No. 837,098. PATENTED NOV. 27, 1906.
A. F. MORTON.
HOSE COUPLING FOR RAILROAD TRAINS.
APPLICATION FILED SEPT. 29, 1906.
2 SHEETS—SHEET 1.
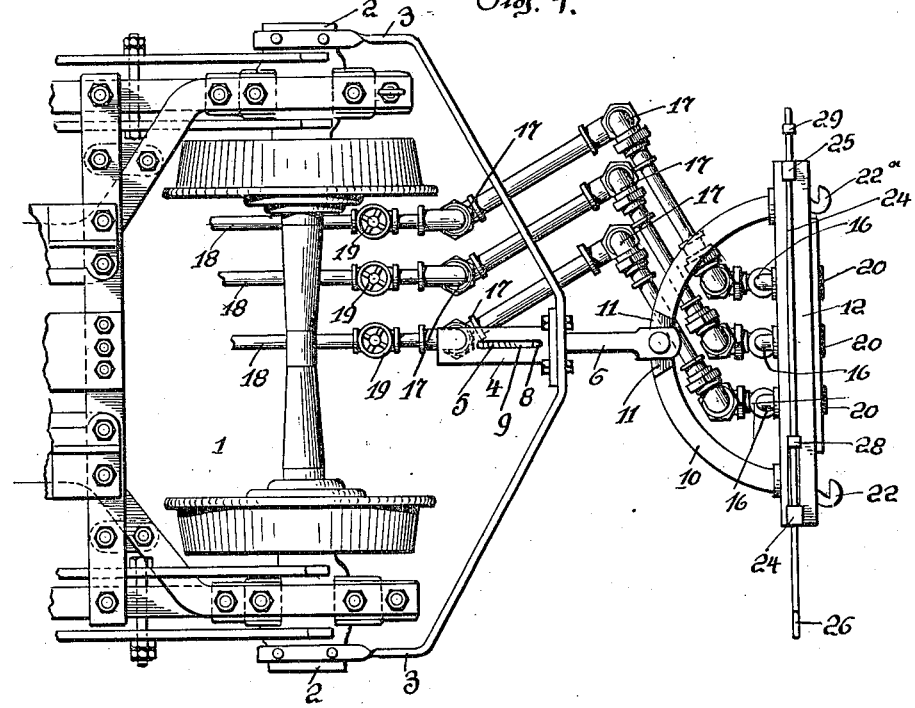
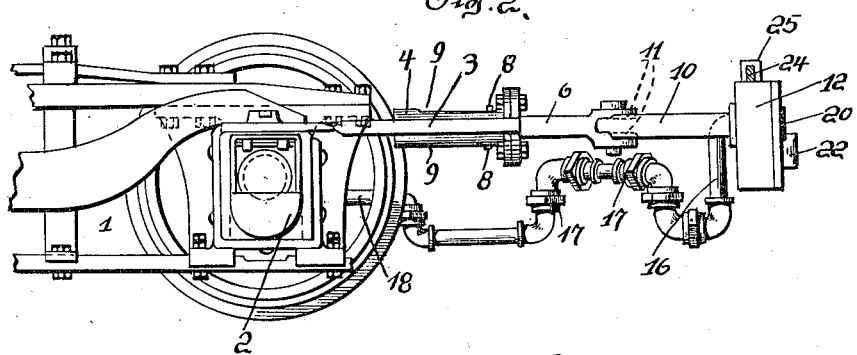
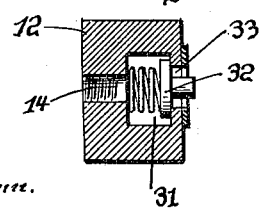
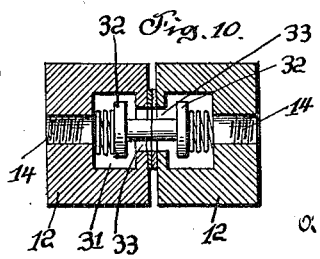
Witnesses:
C. Klostermann.
O. H. Butler.
Inventor.
A. F. Morton.
by Attorneys.

No. 837,098. PATENTED NOV. 27, 1906.
A. F. MORTON.
HOSE COUPLING FOR RAILROAD TRAINS.
APPLICATION FILED SEPT. 29, 1906.
2 SHEETS—SHEET 2.
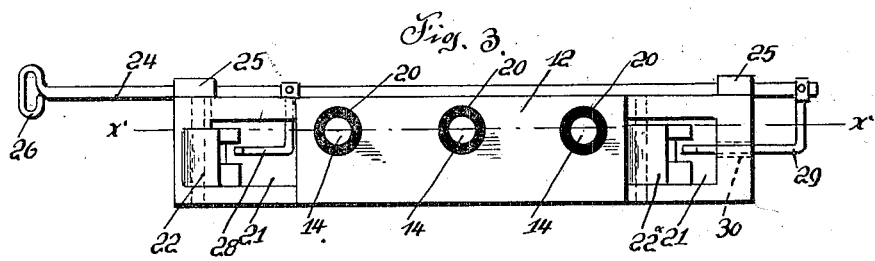
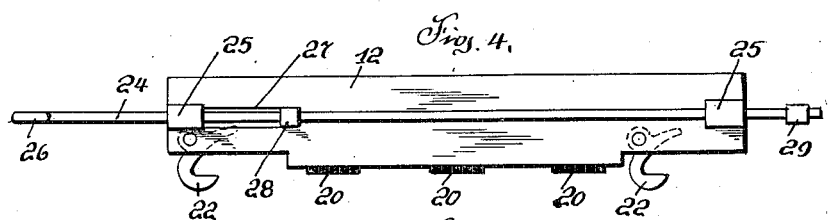
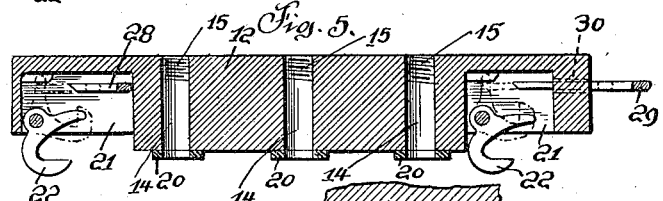
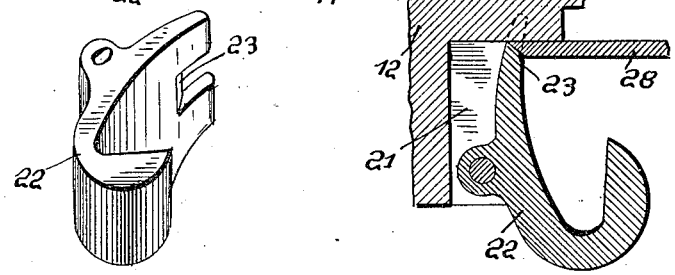
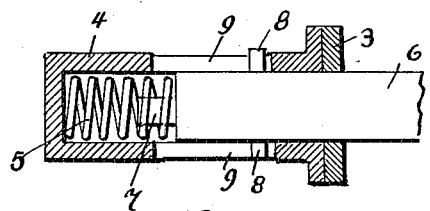
Witnesses:
Inventor.
A. F. Morton.
by
Attorneys

UNITED STATES PATENT OFFICE.

ALEXANDER F. MORTON, OF PITTSBURG, PENNSYLVANIA.

HOSE-COUPLING FOR RAILROAD-TRAINS.

No. 837,098.　　　　Specification of Letters Patent.　　　　Patented Nov. 27, 1906.

Application filed September 29, 1906. Serial No. 336,785.

*To all whom it may concern:*

Be it known that I, ALEXANDER F. MORTON, a citizen of the United States of America, residing at Pittsburg, in the county of Allegheny and State of Pennsylvania, have invented certain new and useful Improvements in Hose-Couplers for Railroad-Trains, of which the following is a specification, reference being had therein to the accompanying drawings.

This invention relates to a coupler particularly designed for cars where two cars and their respective pipes or conduits are to be connected together.

The invention has for its primary object to provide a combined car, steam, air, and water or "whistle" coupler which will be extremely simple in construction, strong and durable, and comparatively inexpensive to manufacture.

Another object of this invention is to provide a flexible coupler which can be used in connection with an ordinary coupler or can be used in lieu of the ordinary coupler for connecting two cars together.

A further object of this invention is to provide a coupler for simultaneously connecting the various train-pipes of one car with the pipes of another car.

With these and other objects in view the invention consists in the novel construction, combination, and arrangement of parts to be presently described in detail and then specifically pointed out in the appended claims.

Referring to the drawings forming part of this specification, like numerals of reference designate corresponding parts throughout the several views, in which—

Figure 1 is a plan of a portion of a truck equipped with my improved coupler. Fig. 2 is a side elevation of the same. Fig. 3 is an end view of the coupler. Fig. 4 is a plan of the coupler-head. Fig. 5 is a horizontal sectional view of the same, taken on the line $x\ x$ of Fig. 3. Fig. 6 is a perspective view of the knuckle of one of the car-couplers. Fig. 7 is an enlarged horizontal sectional view of the same as mounted in the coupler-head. Fig. 8 is a sectional view of a casing constituting part of my invention. Fig. 9 is a detail sectional view illustrating a valve applicable to my improved coupling. Fig. 10 is a similar view illustrating two of the valves connected together.

In the accompanying drawings I have illustrated a portion of a car-truck as supporting my improved coupler. As illustrated, I have provided the journal-boxes 2 of the truck with a frame 3, which spans the end of the truck; but it is obvious that the frame 3 can be readily supported from any convenient part thereof. The frame centrally of the truck is provided with a rearwardly-extending slotted casing 4, which contains the draft-gear of my improved coupler. The casing 4 houses a spring 5, against which a draw-bar 6 bears, said bar having a contracted end 7 entering the spring and lugs or pins 8 entering the slots 9 of the casing, said lugs or pins 8 limiting the outer movement of the draw-bar, while the spring cushions the rearward movement thereof.

Upon the forward end of the draw-bar is pivoted a segment-shaped frame 10, said frame being shouldered, as at 11, adjacent to the draw-bar to limit the horizontal swinging movement of the frame 10 and the coupler-head 12, carried thereby. The head 12 is formed with a plurality of longitudinally-disposed openings 14, said openings being threaded, as at 15, to receive the pipe-sections 16. These sections are connected by a plurality of flexibly-joined sections 17 to pipes 18, arranged in close proximity to the truck 1 and supported from the body of a car (not shown) which is supported by said truck. The pipes 18 are provided with ordinary valves 19, and the joined sections 17 are of a conventional form, such as used between two movable bodies. The outer face of the head 12 is provided with a plurality of gaskets 20, adapted to surround the openings 14 and form an air and steam tight connection between said head and the head (not shown) to be coupled thereto.

The ends of the head 12 are recessed, as at 21, to house pivoted coupler-knuckles 22 and 22ª, these knuckles being of an ordinary type, with the exception that they are provided with locking edges 23. To lock or hold the knuckles 22 and 22ª in a closed position, a bar or rod 24 is slidably mounted in brackets or straps 25 upon the head 12. This bar or rod is provided with a suitable handle 26, whereby it may be readily manipulated from the end of the head 12 or from the side of a car.

The head 12 above one of the recesses 21 is slotted, as at 27, to permit of a locking-arm 28, carried by the bar or rod 24, extending into the recess and engaging the knuckle 22 when the same is closed, as illustrated in Fig.

7 of the drawings. The end of the bar or rod 24 is provided with a depending angular arm 29, adapted to protrude through an opening 30, formed in the end of the head 12, and engage the knuckle 22ª, pivoted in the end of said head.

It will of course be understood from the construction of my improved coupler that it is necessary that the car to be connected with my improved coupler must be equipped with similar couplers. When so equipped, the operation of coupling the cars will be automatic, with the exception of releasing the valves 19 of the pipes 18 to permit air, steam, or water to pass from one car to another.

In lieu of the valves 19 I can provide the coupler-head 12 with recesses 31, with which the openings 14 communicate. In these recesses spring-held valve-heads 32 are mounted, adapted to normally close the recess-openings 33, especially when the coupler-head is not connected with another coupler-head. In Fig. 10 of the drawings I have illustrated two of the heads connected together, where it will be observed that the valve-heads 32 of said coupler-heads are adapted to contact with one another and open the recess-openings 33, thus forming a clear passage from the opening 14 of one coupler-head to the opening 14 of its adjoining head.

In practice I preferably use three pipes, as shown—one of said pipes as an air-brake pipe, one as a steam-pipe, and the other for air to control the whistle-signal of a train of cars.

The coupler-head and its appurtenant parts will be constructed of strong and durable metal capable of withstanding the roughness to which couplers are subjected.

What I claim, and desire to secure by Letters Patent, is—

1. In a coupler, the combination with a truck, and the conduit-pipes of a car, of a frame carried by said truck, a draft-gear casing carried by said frame, a draw-bar mounted in said casing, a segment-shaped frame pivoted to said draw-bar, a coupler-head carried by said segment-shaped frame and having a plurality of openings formed therein adapted to be flexibly connected with said conduit-pipes, coupler-knuckles pivotally mounted in the ends of said head, a bar slidably mounted upon said head, and arms carried by said bar and adapted to lock said knuckles in a closed position, substantially as described.

2. In a coupler, the combination with a truck, and the conduit-pipes of a car, of a frame carried by said truck, a draft-gear casing carried by said frame, a draw-bar mounted in said casing, a frame pivoted to said draw-bar, a coupler-head carried by the last-named frame and having openings formed therein adapted to connect with said pipes, coupler-knuckles pivoted in the ends of said head, and means carried by said head to lock said knuckles in a closed position, substantially as described.

3. In a coupler, the combination with a truck, and the conduit-pipes of a car, of a draft-gear casing supported by said truck, a draw-bar mounted in said casing, a coupler-head pivotally supported by said draw-bar and having openings formed therein adapted to connect with said pipes, coupler-knuckles mounted in said head, and means carried by said head to lock said knuckles in said head, substantially as described.

4. In a coupler, the combination with a truck, of a draft-gear casing supported by said truck, a draw-bar protruding into said casing, a coupler-head carried by said draw-bar, coupler-knuckles mounted in said head, and means carried by said head to lock said knuckles in a closed position, substantially as described.

In testimony whereof I affix my signature in the presence of two witnesses.

ALEXANDER F. MORTON.

Witnesses:
  MAX H. SROLOVITZ,
  A. J. TRIGG.